(12) United States Patent
Vitti et al.

(10) Patent No.: US 11,118,641 B2
(45) Date of Patent: Sep. 14, 2021

(54) ANTIVIBRATION CENTERING RING FOR THE FOOT OF A TORQUE TUBE OF AN AIRCRAFT BRAKE, AND A BRAKE FITTED WITH SUCH A RING

(71) Applicants: Joseph Vitti, Moissy-Cramayel (FR); Romain Le Floch, Villiers-le-Bacle (FR)

(72) Inventors: Joseph Vitti, Moissy-Cramayel (FR); Romain Le Floch, Villiers-le-Bacle (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 53 days.

(21) Appl. No.: 16/503,012

(22) Filed: Jul. 3, 2019

(65) Prior Publication Data
US 2020/0011388 A1   Jan. 9, 2020

(30) Foreign Application Priority Data

Jul. 6, 2018   (FR) ........................ 1856258

(51) Int. Cl.
  *F16D 55/36*   (2006.01)
  *F16D 65/00*   (2006.01)
  *B64C 25/42*   (2006.01)
  *B64C 25/58*   (2006.01)

(52) U.S. Cl.
  CPC .......... *F16D 65/0006* (2013.01); *B64C 25/42* (2013.01); *B64C 25/58* (2013.01); *F16D 65/0056* (2013.01)

(58) Field of Classification Search
  CPC ............................... F16D 55/36; F16D 65/00
  USPC ..... 188/18 A, 71.5, 71.6, 73.31, 73.2, 73.35, 188/73.39; 244/111
  See application file for complete search history.

(56) References Cited

U.S. PATENT DOCUMENTS

| 6,003,641 | A | 12/1999 | Boehringer et al. |
| 6,752,248 | B2 * | 6/2004 | Berwanger ............. F16D 55/36<br>188/71.5 |
| 7,124,860 | B2 * | 10/2006 | Souetre .................. F16D 55/36<br>188/71.5 |

FOREIGN PATENT DOCUMENTS

| FR | 2842496 A1 | 1/2004 |
| GB | 2331135 A | 5/1999 |

OTHER PUBLICATIONS

French Search Report dated Mar. 21, 2019, for French Application No. 1856258, filed Jul. 6, 2018, 2 pages.

\* cited by examiner

*Primary Examiner* — Christopher P Schwartz
(74) *Attorney, Agent, or Firm* — Christensen O'Connor Johnson Kindness PLLC

(57) ABSTRACT

An antivibration centering ring for centering a foot of the torque tube of an aircraft brake on an axle of the aircraft includes alternating bearing zones that are arranged to bear in alternation on the axle and on the torque tube foot. The bearing zones are offset on their non-bearing sides by functional clearance so that no bearing zone bears simultaneously on the axle and on the foot of the torque tube. The bearing zones are connected to one another by flexible ligaments.

5 Claims, 2 Drawing Sheets

ANTIVIBRATION CENTERING RING FOR THE FOOT OF A TORQUE TUBE OF AN AIRCRAFT BRAKE, AND A BRAKE FITTED WITH SUCH A RING

TECHNICAL FIELD

The disclosure relates to an antivibration centering ring for the foot of a torque tube in an aircraft brake.

BACKGROUND

An aircraft wheel is mounted to rotate on an axle carried by an undercarriage. Some wheels are fitted with brakes that generally comprise a torque tube engaged around the axle and having brake disks fitted thereon, comprising rotor disks that rotate with the wheel for braking and stator disks that are prevented from rotating by the torque tube. Brake actuators apply pressure selectively on the disks in order to generate braking torque as a result of the friction generated in this way between the faces of the disks, thereby slowing down the wheel. Torque tubes generally include an annular web extending transversely and carrying a foot that serves to center the torque tube on the axle. A centering ring is fitted under the foot.

Document FR 2 842 496 discloses centering rings having bearing zones that are connected to one another by flexible ligaments. In particular, that document describes a ring (FIG. 8) having some bearing zones with two bearing surfaces each, and other bearing zones with a single bearing surface each. The bearing zones with two bearing surfaces act both on the torque tube foot and on the axle, and they occupy angular ranges close to a substantially horizontal axis X that corresponds to a direction for applying a braking force to the foot of the torque tube. The bearing zones with single bearing surfaces comprise both two bearing zones that act on the foot of the torque tube and that occupy angular ranges close to an axis Y that is perpendicular to the axis X and that corresponds to a direction for applying a landing force, and also, on either side of those two bearing zones, pairs of bearing zones with single bearing surfaces that act on the axle. The bearing zones with single bearing surfaces project from one side only of a structural annulus imparting annular stiffness to the ring.

Those antivibration centering rings therefore have a preferred orientation, which limits their ability to absorb vibration, and which makes them more complicated to install. Furthermore, it has been observed in service that some rings suffer permanent deformation, in particular in the portions of the structural annulus connecting together the bearing zones having single bearing surfaces.

The disclosed aircraft brake includes an antivibration centering ring that does not present the above-mentioned drawbacks.

SUMMARY

The present disclosure describes an aircraft brake comprising a torque tube having a foot arranged to be centered on an aircraft axle, the brake comprising an antivibration centering ring for centering the foot of the torque tube of the aircraft brake on an axle of the aircraft, the centering ring including alternating bearing zones that are arranged to bear in alternation on the axle and on the torque tube foot, and that are offset on their non-bearing sides by functional clearance so that no bearing zone bears simultaneously on the axle and on the foot of the torque tube, these bearing zones being connected to one another by flexible ligaments.

Thus, there are no longer any bearing zones that bear simultaneously on the foot and on the axle, thereby improving vibration absorption. It is necessary to apply a force (a braking force or a landing force) in order to reduce the spacing between the foot and the axle in such a manner that some of the bearing zones come to bear via both of their faces as a result of deformation of the flexible ligaments.

The term "flexible" is used to mean that the ligaments can deform without suffering permanent deformation, as a result of remaining within their elastic range.

The functional clearance on the non-bearing side is given a dimension suitable for absorbing vibration while preventing plastification of the flexible ligaments. It should be observed that unlike the ring in Document FR 2 842 496, all of the bearing zones project in both directions from the flexible ligaments. The flexible ligaments guarantee angular spacing for the bearing zones and they form springs that ensure that the bearing zones come into contact respectively with the torque tube foot or with the axle.

Preferably, the centering ring is obtained by circularly repeating a pattern comprising a bearing zone for bearing on the axle, a first flexible ligament, a bearing zone for bearing on the tube foot, and a second flexible ligament. The centering ring therefore no longer has any preferred orientation, which makes it much easier to install and avoids any need for providing a device for preventing it from rotating.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
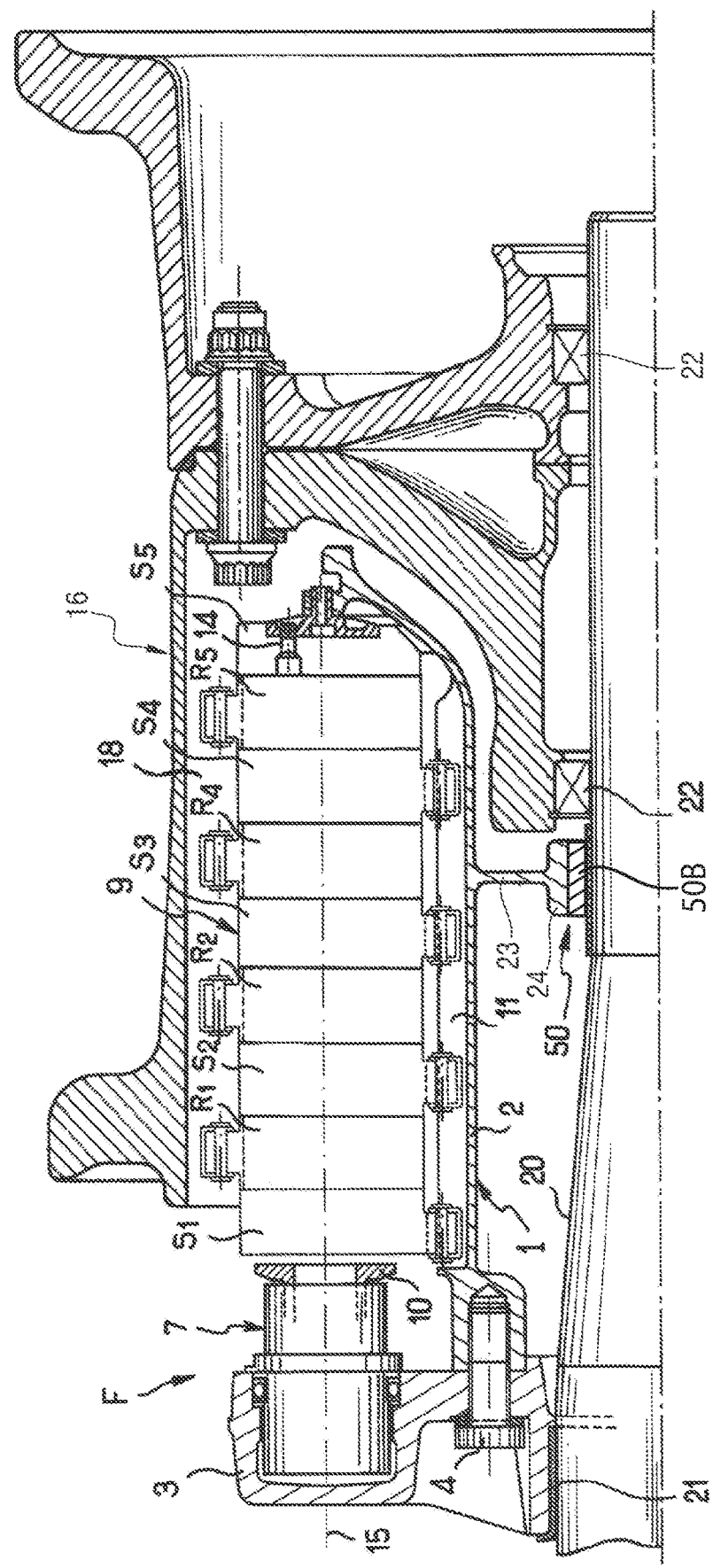
FIG. 1 is a section view of an aircraft wheel fitted with an aircraft brake including a torque tube having an annular web for centering it on the axle.

FIG. 1 shows an aircraft brake F comprising a stationary portion 1 including a torque tube 2 having a brake flange 3 that is fastened to one end, e.g. by means of bolts 4. In this example the flange 3 carries a plurality of actuators 7, each including a piston 10 that applies braking forces.

The stationary portion 1 surrounds an axle 20 coaxially, which axle carries a wheel rim 16 rotatably via bearings 22.

The brake F comprises a stack of brake disks that are engaged on the torque tube 2. These disks comprise stator disks S1, S2, S3, S4, and S5 that are constrained in rotation with the torque tube 2 by tenons 11 projecting from the torque tube 2 for co-operating with tenons of the stator disks, which stator disks are arranged in alternation with rotor disks R1, R2, R3, and R4 that are coupled to rotate with the rim 16 by bars 18 projecting from the rim 16 in order to co-operate with tenons of the rotor disks. The flange 3 is centered on the axle by a first bearing surface provided with a centering ring 21. In addition, the torque tube 2 presents internally a transverse annular web 23 terminated by a foot 24 carrying a centering ring 50 for centering the foot 24 on the axle 20.

Figure 2:
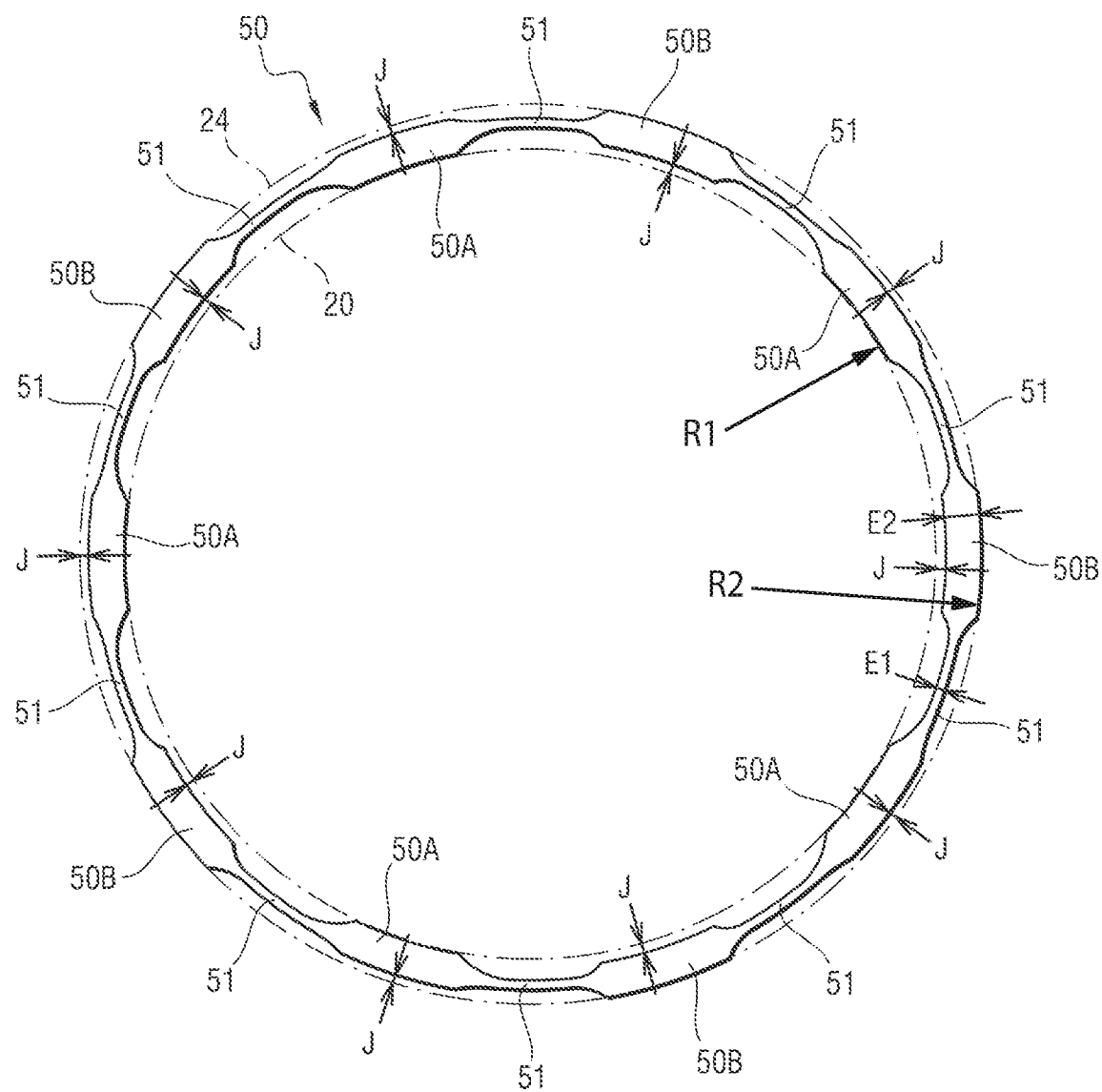
FIG. 2 is a face view of a centering ring of the invention.

As can be seen in FIG. 2, the centering ring 50 has bearing zones 50A and 50B that are arranged in alternating manner and that are interconnected by flexible ligaments 51. Each bearing zone 50A has an inside face bearing on the axle 20, while each bearing zone 50B has an outside face bearing on the foot 24 of the torque tube 2. The inside faces define a minimum inner radius R1 of the centering ring 50, and the outside faces define a maximum outer radius R2 of the centering ring. In 10 this example, the bearing zones 50A and 50B occupy respective angular ranges of about 15°. The faces of the bearing zones 50A and 50B that do not have bearing surfaces are spaced apart respectively from the foot 24 or from the axle 20 by operating clearance J so that no bearing zone bears simultaneously on the foot 24 and on the axle 20. A force (a braking force or a landing force) needs to be applied in order to reduce the spacing 15 between the foot 24 and the axle 20 so that some of the bearing zones come to bear on both faces, as a result of the flexible ligaments 51 deforming. Thus, the centering ring 50 behaves locally like a plain bearing only when it is subjected to deformation that is large enough for the bearing zones to bear on both of their faces. The rest of the time, and in zones that are not subjected to force, they serve to absorb the vibrations that affect the 20 wheels and the brakes.

The minimum functional clearance J under the offset bearing surface is determined in order to optimize absorption of vibration, while the maximum functional clearance J is determined so as to avoid any permanent deformation of the flexible ligaments 51 between the bearing zones. This operating clearance is typically greater than an ordinary assembly clearance (of H7g6 or similar type) and is typically several tenths of a millimeter (mm), preferably lying in the range 0.2 mm to 0.8 mm. This clearance naturally needs to be adapted as a function of the vibration that is observed.

In a preferred embodiment, the bearing zones are of thickness E2 lying in the range 5 mm to 10 mm, whereas the flexible ligaments present a thickness E1 of less than 2 mm. In a preferred embodiment, the flexible ligaments 51 are of thickness E1 that is less than 25% of the thickness E2 in the bearing zone.

In the disclosed embodiment, the flexible ligaments 51 are substantially centered in the space between the foot 24 and the axle 20, being at equal distances from them. The bearing zones 50A and 50B project in both directions from the ligaments 51.

Tests and calculations have shown that good vibration-reducing capacity is obtained, together with good operation as a bearing under external loads (braking, landing), without leading to permanent deformation. No rotation-preventing means are needed, it being entirely possible for the ring to rotate in service without losing its ability to absorb vibration.

The disclosure is not limited to the above description, but on the contrary covers any variant coming within the ambit defined by the claims. In particular, although the embodiments shown have five bearing zones 50A bearing on the axle 20 alternating with five bearing zones 50B bearing on the foot 24, with each bearing zone occupying an angular range of 15°, it is possible to provide for any number of bearing zones, occupying any angular range, so long as there are at least four bearing zones and so long as they are connected together by flexible ligaments. The centering ring is preferably defined by angularly repeating a pattern that comprises in succession one bearing zone for bearing on the axle, a first flexible ligament, one bearing zone for bearing on the foot, and a second flexible ligament, the first and second flexible ligaments not necessarily being identical.

While illustrative embodiments have been illustrated and described, it will be appreciated that various changes can be made therein without departing from the spirit and scope of the invention.

The embodiments of the invention in which an exclusive property or privilege is claimed are defined as follows:

1. An aircraft brake, comprising a torque tube having a foot configured to be centered on an aircraft axle, the brake comprising an antivibration centering ring configured to center the foot of the torque tube on the axle of the aircraft, wherein the centering ring includes alternating bearing zones arranged to bear in alternation on the axle and on the torque tube foot, the bearing zones being offset on their non-bearing sides by functional clearance so that no bearing zone bears simultaneously on the axle and on the foot of the torque tube, the bearing zones being connected to one another by flexible ligaments, wherein the centering ring defines a minimum radius and a maximum radius, a maximum thickness of the centering ring in a radial direction being less than a difference between the maximum radius and the minimum radius.

2. The aircraft brake according to claim 1, wherein the flexible ligaments are centered in a zone extending between the axle and the foot of the torque tube, the bearing zones projecting in both directions from the flexible ligaments.

3. The aircraft brake according to claim 1, wherein the flexible ligaments are of a thickness that is less than 25% of a thickness of the bearing zones.

4. The aircraft brake according to claim 1, wherein the functional clearance is in the range of 0.2 mm to 0.8 mm.

5. The aircraft brake according to claim 1, comprising a circularly repeating pattern in succession of one of the bearing zones bearing on the axle, a first of the flexible ligaments, one of the bearing zones bearing on the foot of the torque tube, and a second of the flexible ligaments.

* * * * *